US010781863B2

(12) United States Patent
Gilliland et al.

(10) Patent No.: US 10,781,863 B2
(45) Date of Patent: Sep. 22, 2020

(54) DRIVESHAFT LOCKING MECHANISM

(71) Applicant: Bell Helicopter Textron Inc., Fort Worth, TX (US)

(72) Inventors: Colton Gilliland, Northlake, TX (US); Mark Alan Przybyla, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 309 days.

(21) Appl. No.: 15/972,170

(22) Filed: May 6, 2018

(65) Prior Publication Data
US 2019/0338810 A1 Nov. 7, 2019

(51) Int. Cl.
*F16D 11/10* (2006.01)
*B64D 35/04* (2006.01)
*B64C 3/56* (2006.01)
*B64C 29/00* (2006.01)
*F16D 11/00* (2006.01)
*F16D 1/10* (2006.01)

(52) U.S. Cl.
CPC ............... *F16D 11/10* (2013.01); *B64C 3/56* (2013.01); *B64C 29/0033* (2013.01); *B64D 35/04* (2013.01); *F16D 2001/103* (2013.01); *F16D 2011/006* (2013.01); *F16D 2300/18* (2013.01)

(58) Field of Classification Search
CPC ... F16D 1/112; F16D 3/06; F16D 3/78; F16D 3/79; F16D 11/10; F16D 2011/2006; F16D 15/00; F16B 21/165; B64D 35/04
See application file for complete search history.

(56) References Cited

U.S. PATENT DOCUMENTS

| | | | | | |
|---|---|---|---|---|---|
| 2,508,558 | A | * | 5/1950 | Wolff | F16D 15/00 474/38 |
| 2,883,020 | A | * | 4/1959 | Kummich | F16H 63/30 192/18 R |
| 3,050,321 | A | * | 8/1962 | Howe | F16D 15/00 403/1 |
| 3,535,752 | A | * | 10/1970 | Dzus | F16B 5/10 411/555 |
| 4,977,989 | A | * | 12/1990 | Ashikawa | B60K 17/35 192/113.33 |

(Continued)

FOREIGN PATENT DOCUMENTS

FR 2984243 A1 * 6/2013 ........... B60K 17/043

*Primary Examiner* — Joseph W Sanderson
(74) *Attorney, Agent, or Firm* — Lightfoot & Alford PLLC

(57) ABSTRACT

A locking mechanism for locking a driveshaft in cooperative engagement with an apparatus includes a drive portion coupled to the driveshaft and a driven portion coupled to the apparatus. The drive portion of the locking mechanism includes a housing with a first engagement portion, a ball cage with a plurality locking balls contained at least partially therein, and a chock biased away from the housing by a chock spring. The chock includes an outer wall configured to push the locking balls outward in a locked position and allow inward movement in an unlocked position. Movement of the chock, and therefore locking, is controlled by an actuator rod extending through a center of the locking mechanism. The driven portion includes a second engagement portion configured to cooperatively engage and receive torque from the first engagement portion, and a locking groove configured to receive a portion of each of the plurality of locking balls therein.

20 Claims, 10 Drawing Sheets

(56) References Cited

U.S. PATENT DOCUMENTS

| | | | | |
|---|---|---|---|---|
| 5,038,884 | A * | 8/1991 | Hamada | B60K 17/35 |
| | | | | 180/233 |
| 5,360,376 | A | 11/1994 | Baldino | |
| 5,522,669 | A * | 6/1996 | Recker | F16B 21/165 |
| | | | | 403/325 |
| 6,520,305 | B2 * | 2/2003 | Dick | F16D 11/10 |
| | | | | 192/108 |
| 6,942,082 | B1 * | 9/2005 | Bunnow | F16D 11/10 |
| | | | | 180/6.2 |
| 7,464,450 | B2 * | 12/2008 | Potter | B04B 9/08 |
| | | | | 29/428 |
| 8,251,606 | B2 * | 8/2012 | Blanchard | A01B 33/028 |
| | | | | 294/57 |
| 9,376,206 | B2 * | 6/2016 | Ross | B64C 29/0033 |
| 9,494,202 | B2 * | 11/2016 | Sunada | F16D 15/00 |
| 2002/0153220 | A1 * | 10/2002 | Dick | F16D 11/10 |
| | | | | 192/69.8 |
| 2014/0263854 | A1 * | 9/2014 | Ross | B64C 29/0033 |
| | | | | 244/7 A |

\* cited by examiner

DRIVESHAFT LOCKING MECHANISM

BACKGROUND

Many types of aircraft include elongated wings that extend laterally from a fuselage. These types of aircraft generally occupy a large amount of space and have a large overall footprint. As such, when these types of aircraft are not in use, they occupy an undesirably large amount of space to store them on aircraft carriers, in hangars, runways, and other spaces. And furthermore, access to hangars and/or other indoor maintenance or repair facilities may be restricted because some types of aircraft may not fit through the doors and/or entrances of such facilities. Accordingly, technology has been developed that allows for the rotation of the wing relative to the fuselage to minimize the footprint of the aircraft. One such example is disclosed in U.S. patent application Ser. No. 15/898,550, filed Feb. 17, 2018, titled Selectively Engageable Aircraft Driveshaft Off-Axis From Component Stow Axis, which is incorporated herein by reference in its entirety. The selectively engageable driveshaft is translated along its axis of rotation between an engaged and disengaged position by an actuator. Another such example is disclosed in U.S. patent application Ser. No. 15/961,609, filed Apr. 24, 2018, titled Compressible Driveshaft, which is incorporated herein by reference in its entirety. The compressible driveshaft is compressed and expanded between an engaged and disengaged configuration by an actuator. Both driveshafts would benefit from locking mechanisms that lock the driveshafts in the engaged configurations.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a locking mechanism for locking a disengageable driveshaft in an engaged position. The locking mechanism is described and show in conjunction with a compressible driveshaft configured to transition between an engaged configuration and a disengaged configuration but may also be used with a rigid driveshaft. In the engaged configuration the compressible driveshaft is cooperatively engaged with and configured to transfer torque to an apparatus. In the disengaged configuration, the compressible driveshaft is compressed to a shorter length so that the compressible driveshaft is no longer engaged to drive the apparatus. The locking apparatus locking driveshaft to the apparatus to ensure there is not accidental separation during operation. While this disclosure describes the locking mechanism for use on an aircraft, its application is not so limited. It should be understood that the disclosed locking mechanism could be used with any application that may benefit from locking a driveshaft in engagement.

Figure 1:
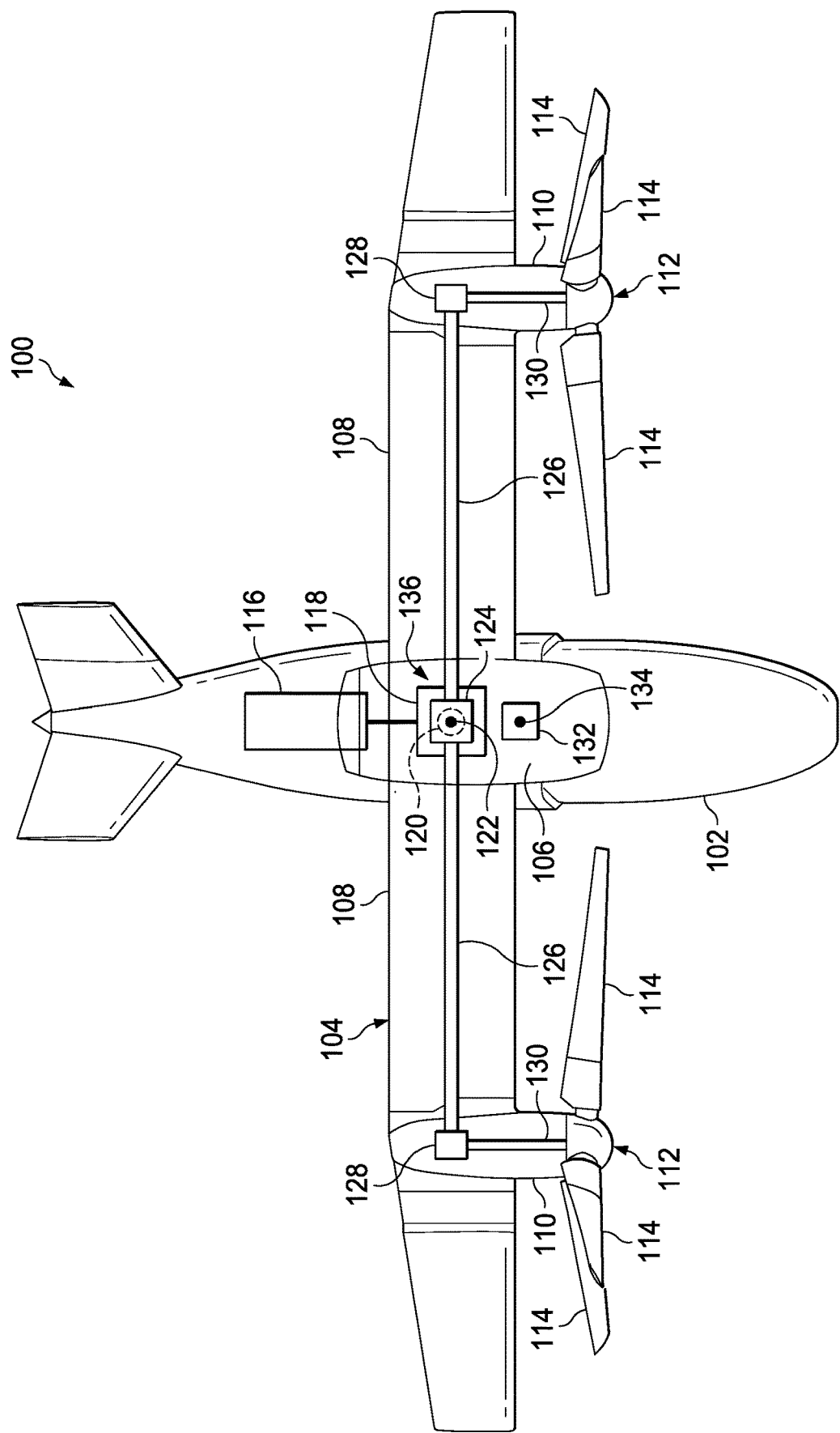
FIG. 1 is a top view of an aircraft according to this disclosure.

Referring now to FIG. 1, a top view of an aircraft 100 is shown according to this disclosure. Aircraft 100 is shown and described as a tiltrotor aircraft. However, aircraft 100 may be any type of vehicle. Aircraft 100 includes a fuselage 102 and a stowable wing assembly 104 including a rotatable wing body 106 and a plurality of wings 108 extending therefrom. Each wing 108 has a pylon 110 coupled thereto. Pylons 110 each include a rotor assembly 112 with a plurality of rotor blades 114. Each pylon 110 is rotatable between a horizontal orientation and a vertical orientation with respect to fuselage 102 and associated wing 108 to adjust the thrust angle and transition aircraft 100 between an airplane mode and a helicopter mode. Accordingly, the airplane mode is associated with a more horizontally-oriented thrust angle and propelling aircraft 100 forward in flight, while the helicopter mode is associated with a more vertically-oriented thrust angle and propelling aircraft 100 to and from a landing area.

Aircraft 100 also includes a drive component carried in fuselage 102. In the embodiment shown, the drive component includes an internal combustion engine 116 coupled to an engine reduction gearbox 118 which features a compressible driveshaft 120. However, in other embodiments, the drive component may comprise a direct-drive electric motor, a direct-drive engine, a motor and gearbox combination, or an engine and a redirection gearbox, each including compressible driveshaft 120. In the embodiment shown, operation of internal combustion engine 116 causes compressible driveshaft 120 to rotate about a rotation axis 122. Compressible driveshaft 120 is extended and compressed axially along rotation axis 122 to engage and disengage from an auxiliary or mid-wing gearbox 124 disposed within rotatable wing body 106 of wing assembly 104. Mid-wing gearbox 124 is operatively coupled to an interconnect driveshaft 126 extending therefrom through each wing 108 to a pylon gearbox 128 disposed in each pylon 110. Each pylon gearbox 128 is coupled to associated rotor assembly 112 through a rotor mast 130. Thus, when compressible driveshaft 120 is engaged with mid-wing gearbox 124, rotation of compressible driveshaft 120 imparted by internal combustion engine 116 is transmitted through mid-wing gearbox 124 to interconnect driveshafts 126 and rotor masts 130 to impart rotation to counter-rotating rotor assemblies 112. Conversely, when compressible driveshaft 120 is disengaged from mid-wing gearbox 124, rotation of compressible driveshaft 120 will not impart rotation to rotor assemblies 112. As such, compressible driveshaft 120 allows internal combustion engine 116 to operate to run pre-flight checks, provide electrical power, and/or provide functions of an auxiliary power unit without engaging rotor assemblies 112.

Aircraft 100 may also include a wing assembly rotation system 132 configured to rotate wing assembly 104 with respect to fuselage 102 about a stow axis 134. Most notably, stow axis 134 is offset from rotation axis 122 of compressible driveshaft 120. More specifically, stow axis 134 is displaced longitudinally along a length of fuselage 102 with respect to rotation axis 122 of compressible driveshaft 120. In some embodiments, the offset between stow axis 134 and rotation axis 122 may be about twelve inches. The location of rotation axis 122 is generally determined by the optimal placement of interconnect driveshafts 126 and/or mid-wing gearbox 124 within wing assembly 104. Stow axis 134 is generally selected to center wing assembly 104 over fuselage 102, thereby reducing the overall footprint of aircraft 100 when wing assembly 104 is rotated. Further, offsetting stow axis 134 further forward on wing assembly 104 may provide structural benefits, such as allowing rotation of wing assembly 104 in a thicker, more structurally rigid portion of wing assembly 104. Additionally, as will be discussed in more detail below, compressible driveshaft 120 must be capable of disengaging from mid-wing gearbox 124 and fully withdrawing from wing assembly 104 because stow axis 134 and rotation axis 122 are not co-axial. Because engine reduction gearbox 118, compressible driveshaft 120, mid-wing gearbox 124, and wing assembly rotation system 132 function together to facilitate the transition to a stowed configuration, they may be referred to collectively as a stow system 136.

Figure 2:
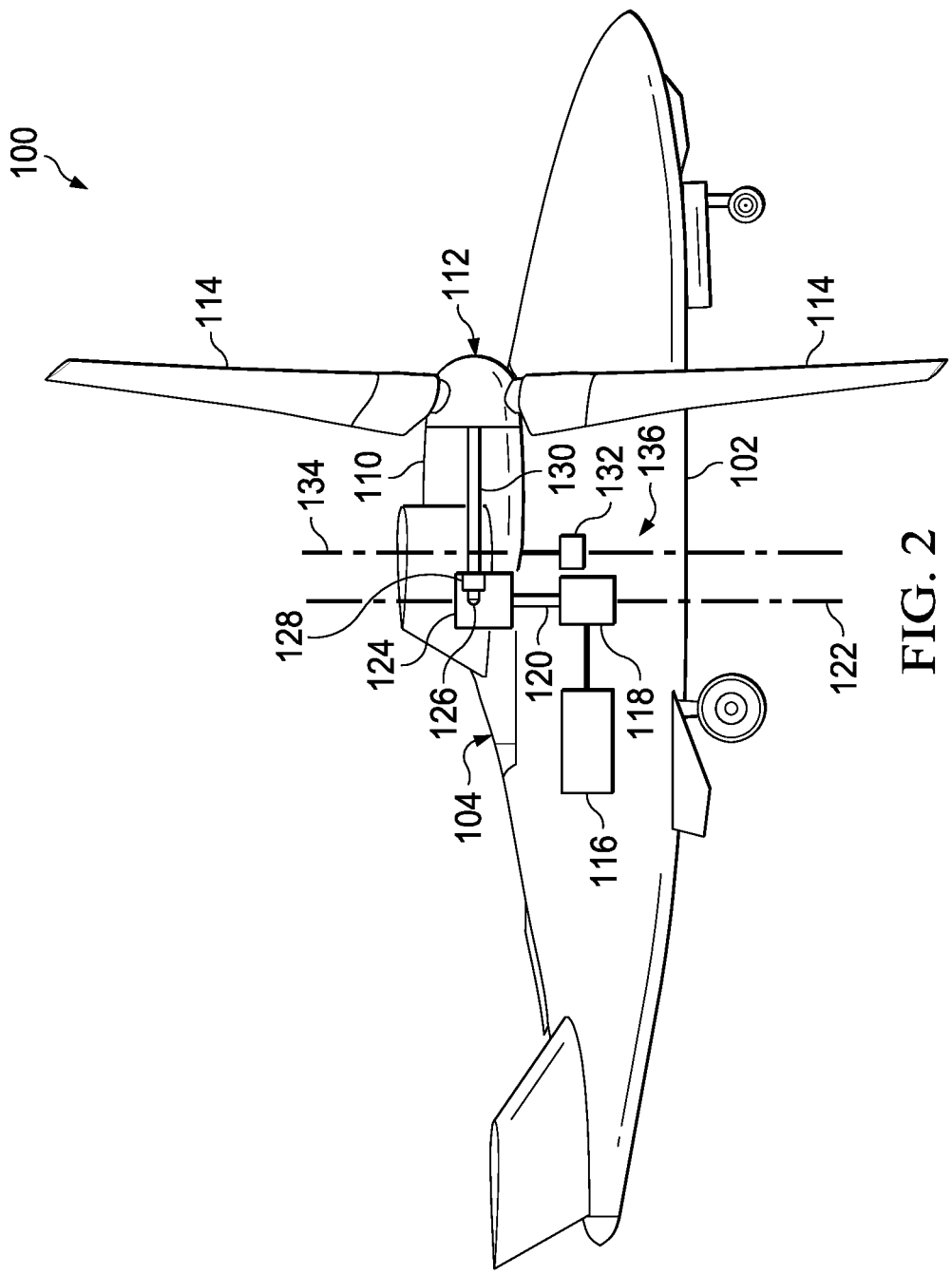
FIG. 2 is a side view of the aircraft of FIG. 1.

Referring now to FIG. 2, aircraft 100 is shown with compressible driveshaft 120 engaged with mid-wing gearbox 124 and wing assembly 104 in a flight position. As shown, compressible driveshaft 120 is expanded vertically to engage mid-wing gearbox 124 when wing assembly 104 is configured in the flight position. Thus, when compressible driveshaft 120 is engaged with mid-wing gearbox 124, rotational motion of compressible driveshaft 120 imparted by internal combustion engine 116 is transferred through mid-wing gearbox 124 to interconnect driveshafts 126 and rotor masts 130 to impart rotation to counter-rotating rotor assemblies 112 to propel aircraft 100.

Figure 3:
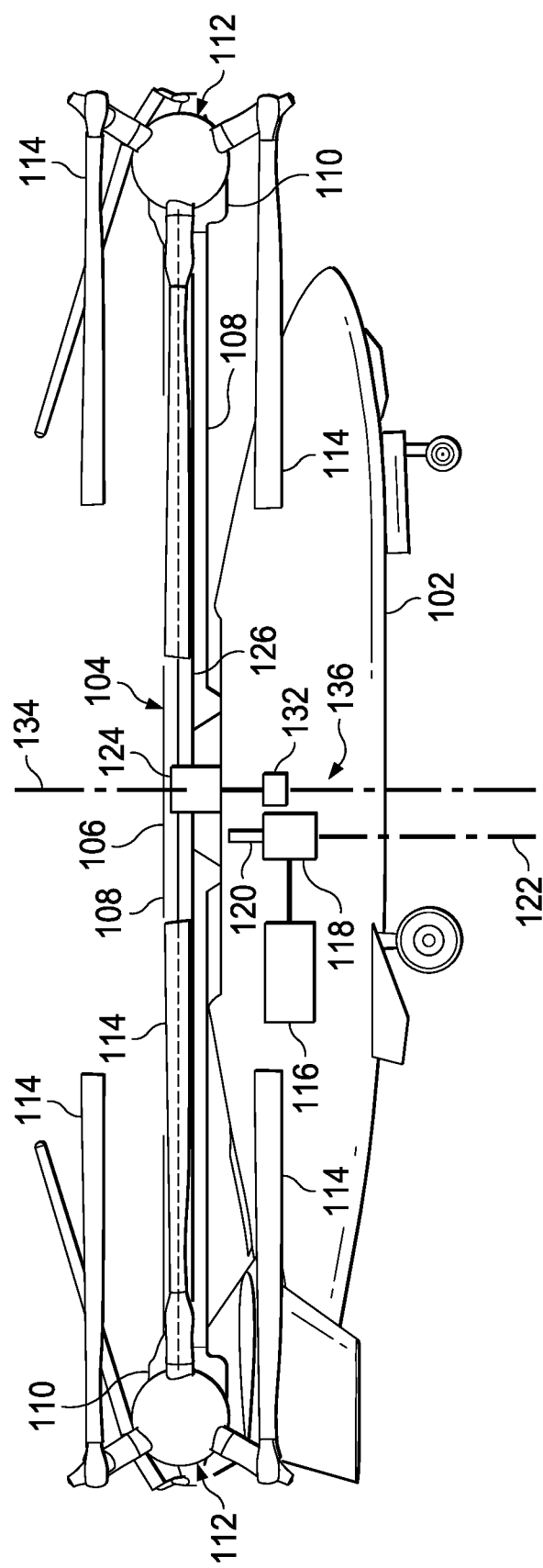
FIG. 3 is another side view of the aircraft of FIG. 1.

Referring now to FIG. 3, aircraft 100 is shown with compressible driveshaft 120 disengaged from mid-wing gearbox 124 and wing assembly 104 in a stowed position. As shown, compressible driveshaft 120 is compressed vertically to disengage from mid-wing gearbox 124. After compressible driveshaft 120 is disengaged from mid-wing gearbox 124, wing assembly 104 may be rotated relative to fuselage 102 about stow axis 134 in a clockwise direction as viewed from the top of aircraft 100 until wing assembly 104 reaches the stowed position. In the stowed position, compressible driveshaft 120 is misaligned from mid-wing gearbox 124. In some embodiments, the stowed configuration of wing assembly 104 may be reached after wing assembly 104 is rotated about ninety degrees. Furthermore, wing assembly 104 may be rotated relative to fuselage 102 about stow axis 134 in a counter-clockwise direction.

Figure 4A:
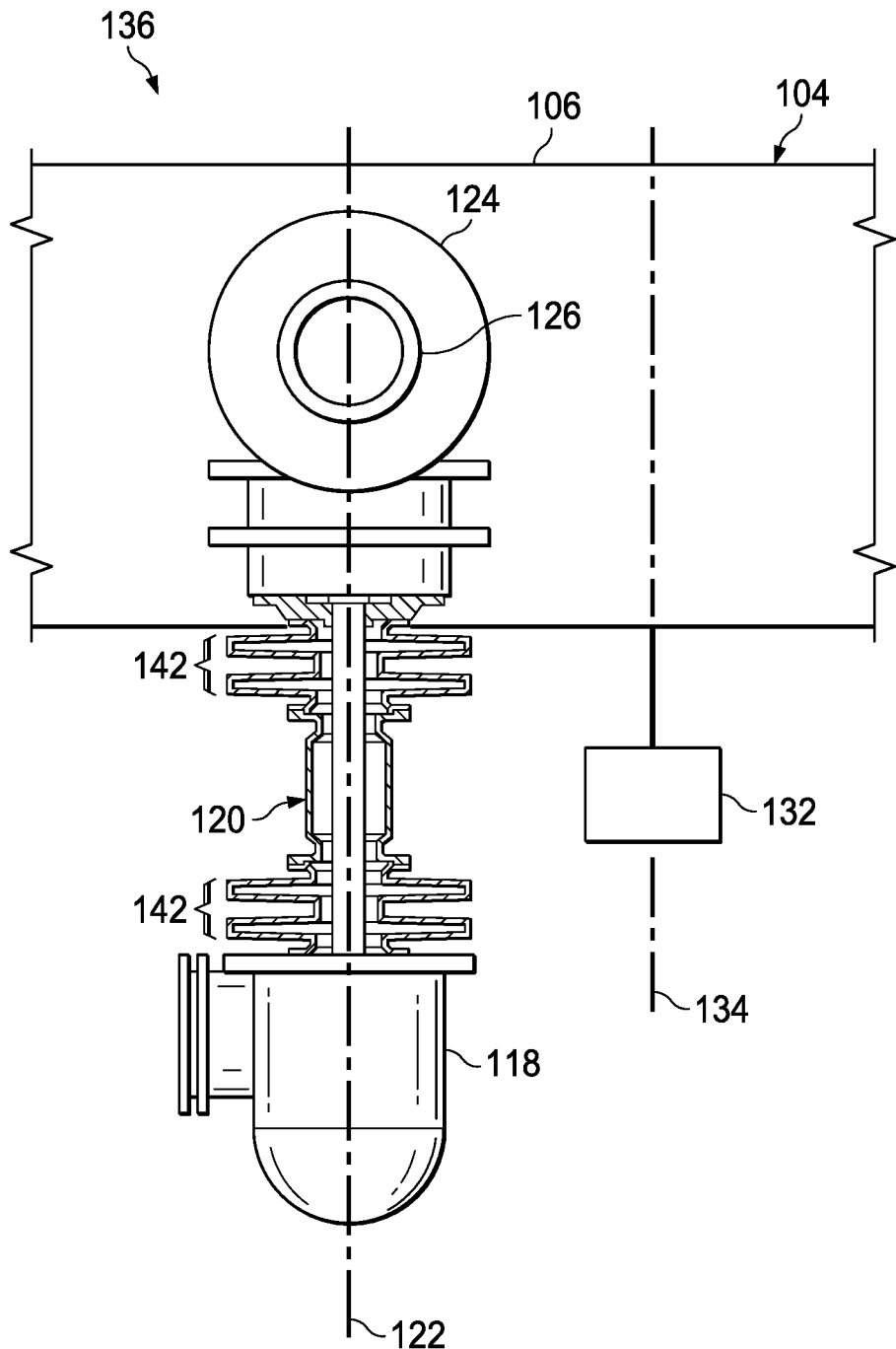
FIG. 4A is a side view of a stow system of the aircraft of FIG. 1 in an engaged position.
Figure 4B:
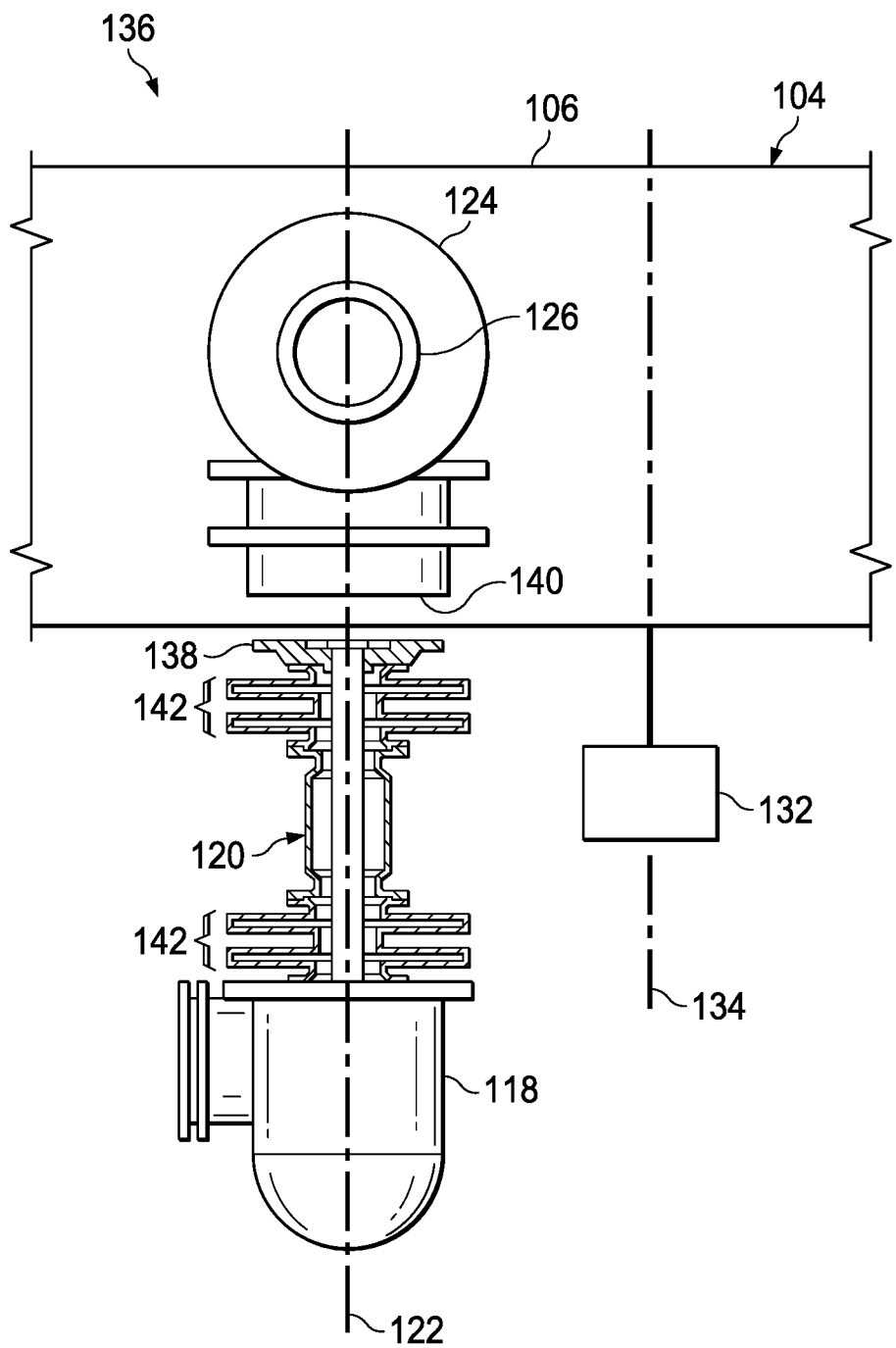
FIG. 4B is a side view of the stow system of the aircraft of FIG. 1 in a disengaged position.
Figure 4C:
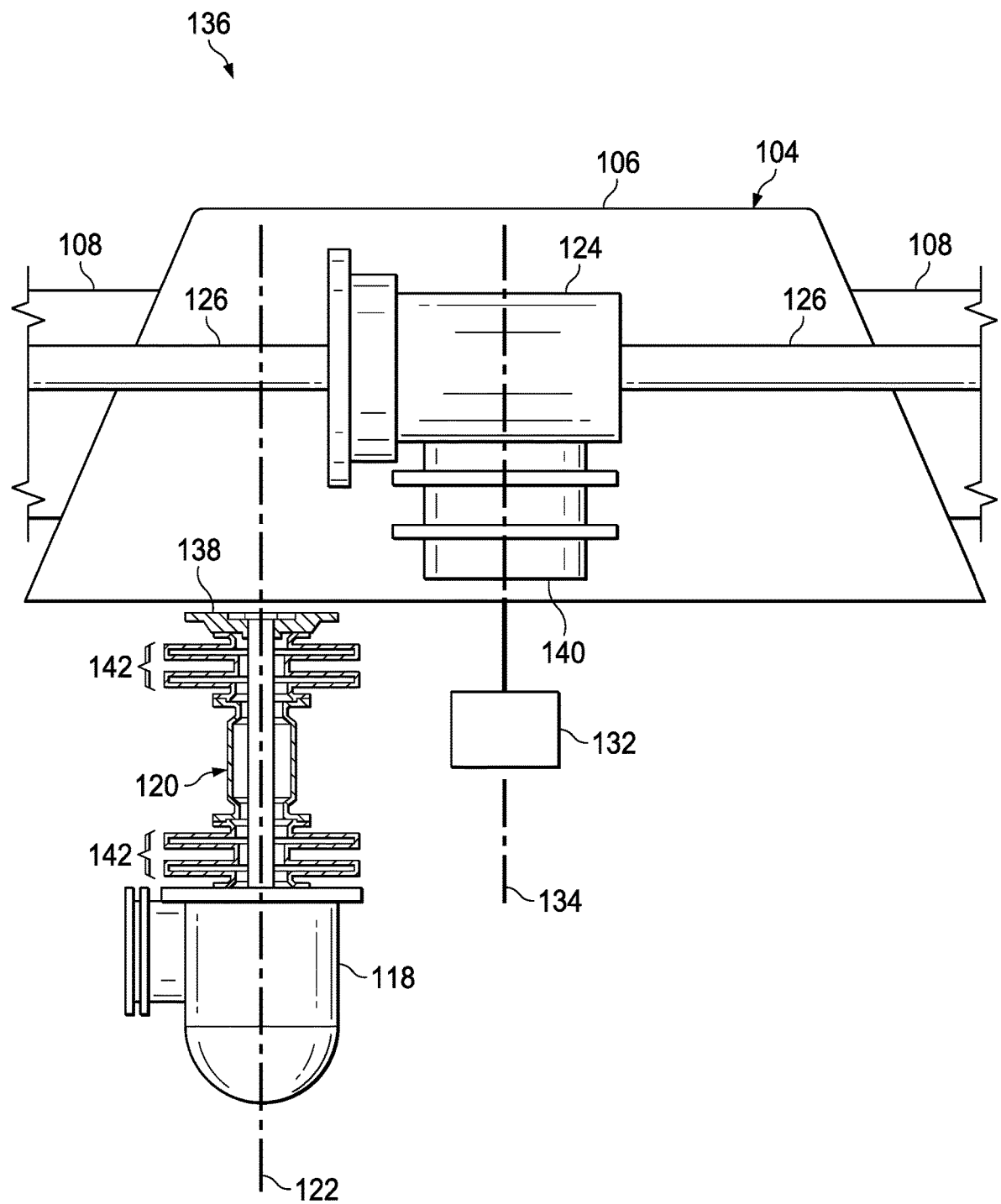
FIG. 4C is a side view of the stow system of the aircraft of FIG. 1 in the disengaged and stowed position.
Figure 5A:
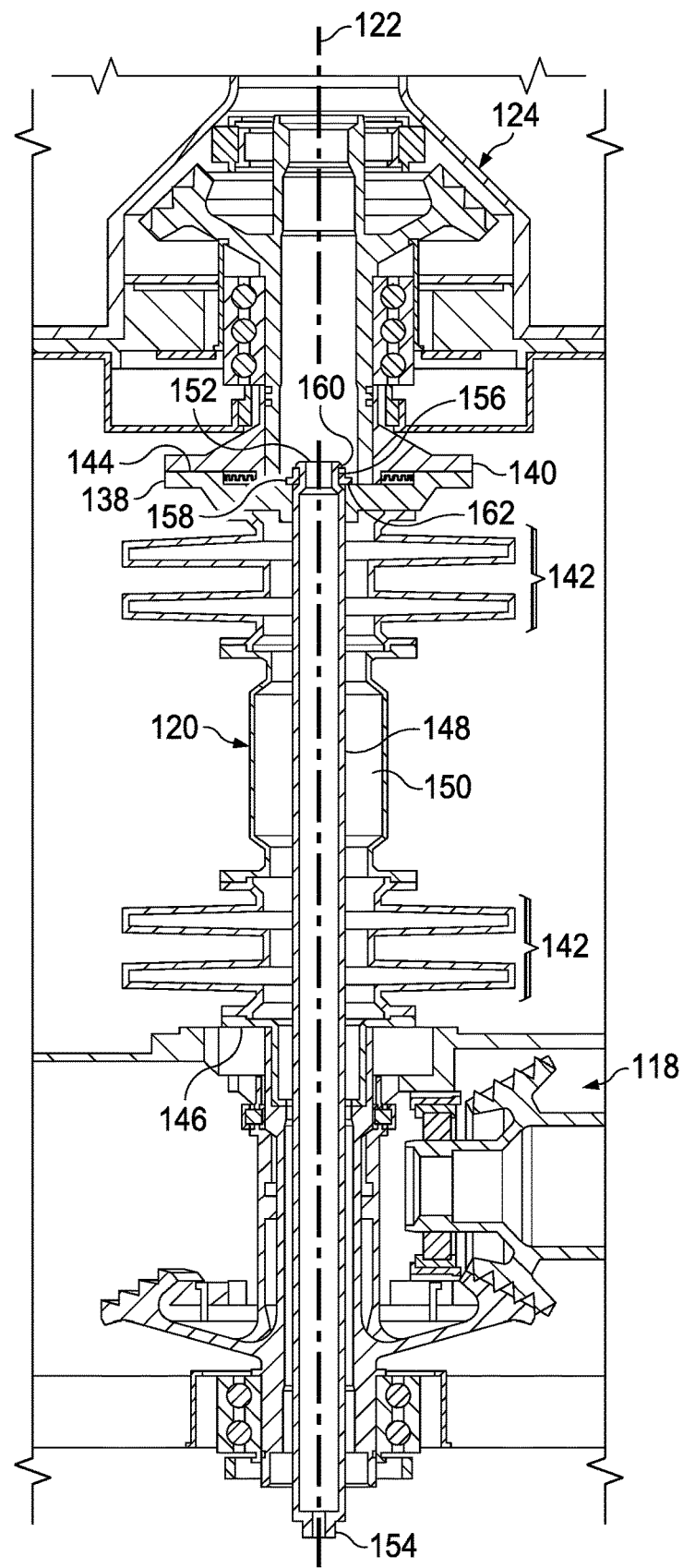
FIG. 5A is a cross-sectional side view of a compressible driveshaft for use with the stow system of FIG. 4A, shown in an engaged position.
Figure 5B:
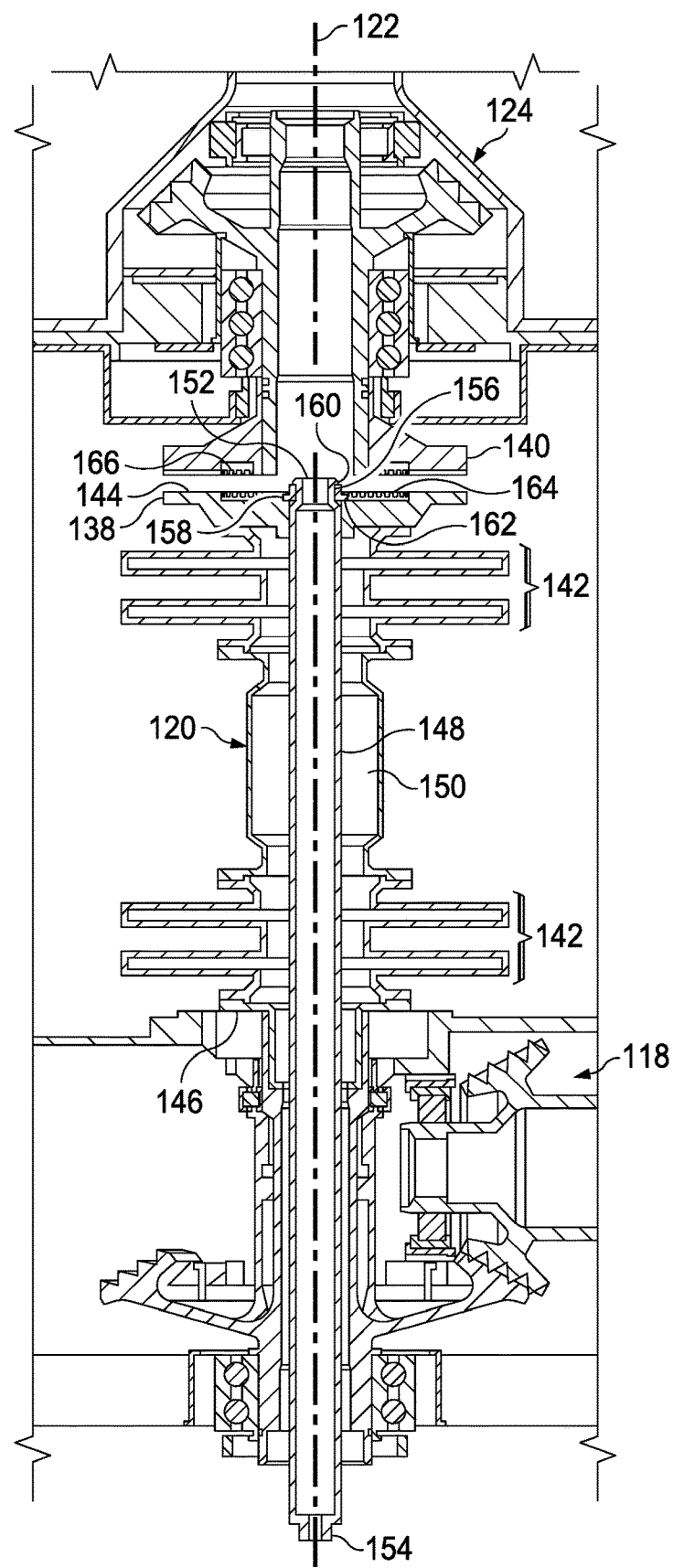
FIG. 5B is a cross-sectional side view of the compressible driveshaft for use with the stow system of FIG. 4A, shown in a disengaged position.

FIGS. 4A-4C, side views of stow system 136 of aircraft 100 of FIGS. 1-3 are shown according to this disclosure. Moreover, FIGS. 4A and 5A show compressible driveshaft 120 in an engaged configuration wherein compressible driveshaft 120 is expanded and engaged with mid-wing gearbox 124 and wing assembly 104 in the flight position, FIGS. 4B and 5B show compressible driveshaft 120 in a disengaged configuration wherein compressible driveshaft 120 is compressed and disengaged from mid-wing gearbox 124 and wing assembly 104 in the flight position, and FIG. 4C shows compressible driveshaft 120 compressed and disengaged from mid-wing gearbox 124 and wing assembly 104 rotated about stow axis 134 into the stowed position. Compressible driveshaft 120 and mid-wing gearbox 124 may comprise an interface designed to properly align an engagement portion 138 of compressible driveshaft 120 and a mating surface 140 of mid-wing gearbox 124 when compressible driveshaft 120 is being expanded to engage mid-wing gearbox 124. Proper alignment of engagement portion 138 and mating surface 140 may be facilitated by utilizing one or more position sensors (not shown) in conjunction with a rotor phasing unit (not shown). The rotor phasing unit may be used to determine the rotational position of mating surface 140 and the position sensors may be used to determine the rotational position of engagement portion 138. With the relative positions known, compressible driveshaft 120 may be rotated the required amount for proper alignment of engagement portion 138 and mating surface 140.

In operation, compressible driveshaft 120 is expanded and compressed to engage and disengage from, respectively, mid-wing gearbox 124. Expansion and compression of compressible driveshaft 120 is possible because of the inclusion of one or more compressible sections 142 in compressible driveshaft 120. Compressible sections 142 include elastically deformable elements (not shown) configured to, absent sufficient axial loading, maintain compressible sections 142 in a fully expanded configuration. Compressible sections 142 are configured to compress under a known axial load and are only permitted to compress a known amount, thereby preventing plastic deformation thereof. In the embodiment shown, compressible sections 142 comprise diaphragm couplings. However, any mechanically viable means of creating compressibility may be utilized. Compression of compressible sections 142, and therefore compressible driveshaft 120, is accomplished by a compressive force applied to compressible driveshaft 120 anywhere between a first end 144 and compressible section 142. The compressive force being directed along rotation axis 122 towards a second end 146, and second end 146 being axially fixed in place. When the applied compressive force exceeds the expansive force of the elastically deformable elements (not shown), compressible sections 142 compress, thereby reducing the length of compressible driveshaft 120.

In the embodiment shown, the compressive force is applied to compressible driveshaft 120 by an actuator rod 148 that extends through a hollow interior channel 150 of compressible driveshaft 120. Actuator rod 148 includes a top end 152 configured to engage first end 144 of compressible driveshaft 120 and a bottom end 154 configured to be coupled to an actuator (not shown). To facilitate insertion of actuator rod 148 through interior channel 150 during assembly, an outer diameter of actuator rod 148 must be less than an inner diameter of interior channel 150. Accordingly, the structure for engaging first end 144 should be installed after insertion through interior channel 150. As such, actuator rod 148 includes a groove 156 at top end 152 and an annular flange 158 installed in groove 156. Annular flange 158 may be coupled to actuator rod 148 by a nut 160. Annular flange 158 has a larger outer diameter than the inner diameter of interior channel 150 and a bottom surface 162 configured to bear against first end 144 of compressible driveshaft 120. The actuator translates actuator rod 148 along rotation axis 122. The actuator may be actuated electrically, electro-mechanically, hydraulically, and/or mechanically. For example, in some embodiments, actuator rod 148 may be extended and retracted by a rack and pinion. However, in other embodiments, actuator rod 148 may be extended and retracted by a machine screw type system.

When compressible driveshaft 120 is in the engaged configuration, as shown in FIGS. 4A and 5A, compressible sections 142 are expanded and engagement portion 138 is engaged with mating surface 140 of mid-wing gearbox 124. In this configuration, actuator rod 148 is not applying any force to compressible driveshaft 120. When it is no longer desired to transfer torque from engine reduction gearbox 118 to mid-wing gearbox 124, compressible driveshaft 120 may be transitioned to the disengaged configuration, as shown in FIGS. 4B and 5B. Before disengaging compressible driveshaft 120 from mid-wing gearbox 124, the torque differential between engagement portion 138 and mating surface 140 should be zero. Disengagement is commenced when the actuator causes actuator rod 148 to translate along rotation axis 122 towards second end 146. The translation of actuator rod 148 causes a compressive force to be transmitted from bottom surface 162 of annular flange 158 to first end 144 of compressible driveshaft 120. When the compressive force applied by actuator rod 148 exceeds the expansive force of compressible sections 142, compressible sections 142 begin to compress, thereby decreasing the length of compressible driveshaft 120 and disengaging engagement portion 138 from mating surface 140. For the operation in the embodiment shown, the length of compressible driveshaft 120 may be decreased by one-half inch or more. However, less compression may be acceptable for different utilizations of compressible driveshaft 120. After compressible driveshaft 120 is transitioned to the disengaged configuration, wing assembly 104 may be rotated relative to fuselage 102 about stow axis 134 until wing assembly 104 reaches the stowed position as shown in FIG. 4C. Once stow system 136 of aircraft 100 is configured as shown in FIGS. 3 and 4C, aircraft 100 may be parked, stowed, and/or driven into an entrance of a hangar while reducing the overall footprint of aircraft 100, thereby allowing for more compact storage of aircraft 100. Optionally, if no part of wing assembly 104 is located above compressible driveshaft 120 while aircraft 100 is in the stowed position, the compressive force applied by actuator rod 148 may be released, allowing compressible driveshaft 120 to be stored in the relaxed state.

To prepare aircraft 100 for flight from the stowed position shown in FIG. 4C, wing assembly 104 is rotated relative to fuselage 102 about stow axis 134 until wing assembly 104 reaches the flight position shown in FIG. 4B. Thereafter, the compressive force applied by actuator rod 148 is released from compressible driveshaft 120, allowing compressible sections 142 to expand and increase the length of compressible driveshaft 120 until engagement portion 138 engages with mating surface 140 of mid-wing gearbox 124, as shown in FIGS. 2, 4A, and 5A, wherein aircraft 100 is configured for flight.

Engagement portion 138 and mating surface 140 may comprise any configuration that is mechanically sufficient to transmit the required torque therebetween. As such, engagement portion 138 and mating surface 140 may comprise longitudinal splines parallel to rotation axis 122, or in operations that transfer less torque, friction plates or bevel gears. However, given the high torque transfer required in the embodiment shown, and a desire to minimize the amount of compression required for disengagement, engagement portion 138 and mating surface 140 comprise a face spline 164 and a face spline 166, respectively. As mentioned above, to ensure proper alignment of the complementary teeth of face spline 164 and face spline 166, position sensors (not shown) may be utilized in conjunction with the rotor phasing unit (not shown) to determine the relative positions of the teeth. With the relative positions known, compressible driveshaft 120 may be rotated the required amount for proper alignment of the teeth. Once the teeth are properly aligned, the compressive force applied by actuator rod 148 may be released, allowing face spline 164 to move into cooperative engagement with face spline 166. Alternatively, engagement portion 138 and mating surface 140 may include features configured to correct misalignment therebetween. For example, engagement portion 138 and mating surface 140 may include pointed teeth which cause relative rotation between the engagement portion 138 and mating surface 140 during engagement therebetween.

Because engagement of compressible driveshaft 120 must be maintained with mid-wing gearbox 124 in order to maintain flight of aircraft 100, it is imperative that the engagement is failsafe. As discussed above, the expansive force of compressible sections 142 cause the engagement of engagement portion 138 with mating surface 140. While this expansion force alone may be sufficient to maintain that engagement, it is advisable to utilize a locking mechanism to maintain the engagement, preferably one that is automatically engaged and disengaged by movement of actuator rod 148, without requiring additional input. Accordingly, the locking mechanism described below may be utilized to retain engagement portion 138 in cooperative engagement with mating surface 140. In addition, locking engagement portion 138 to mating surface 140 will allow compressible sections 142 to absorb axial forces without risk of disengagement. Moreover, a difference in the outer diameter of actuator rod 148 and inner diameter of interior channel 150 will enable compressible section 142 to deflect slightly off-axis, thereby enabling compressible driveshaft 120 to allow for some axial misalignment between engine reduction gearbox 118 and mid-wing gearbox 124 during operation, without risk of disengagement.

Figure 6A:
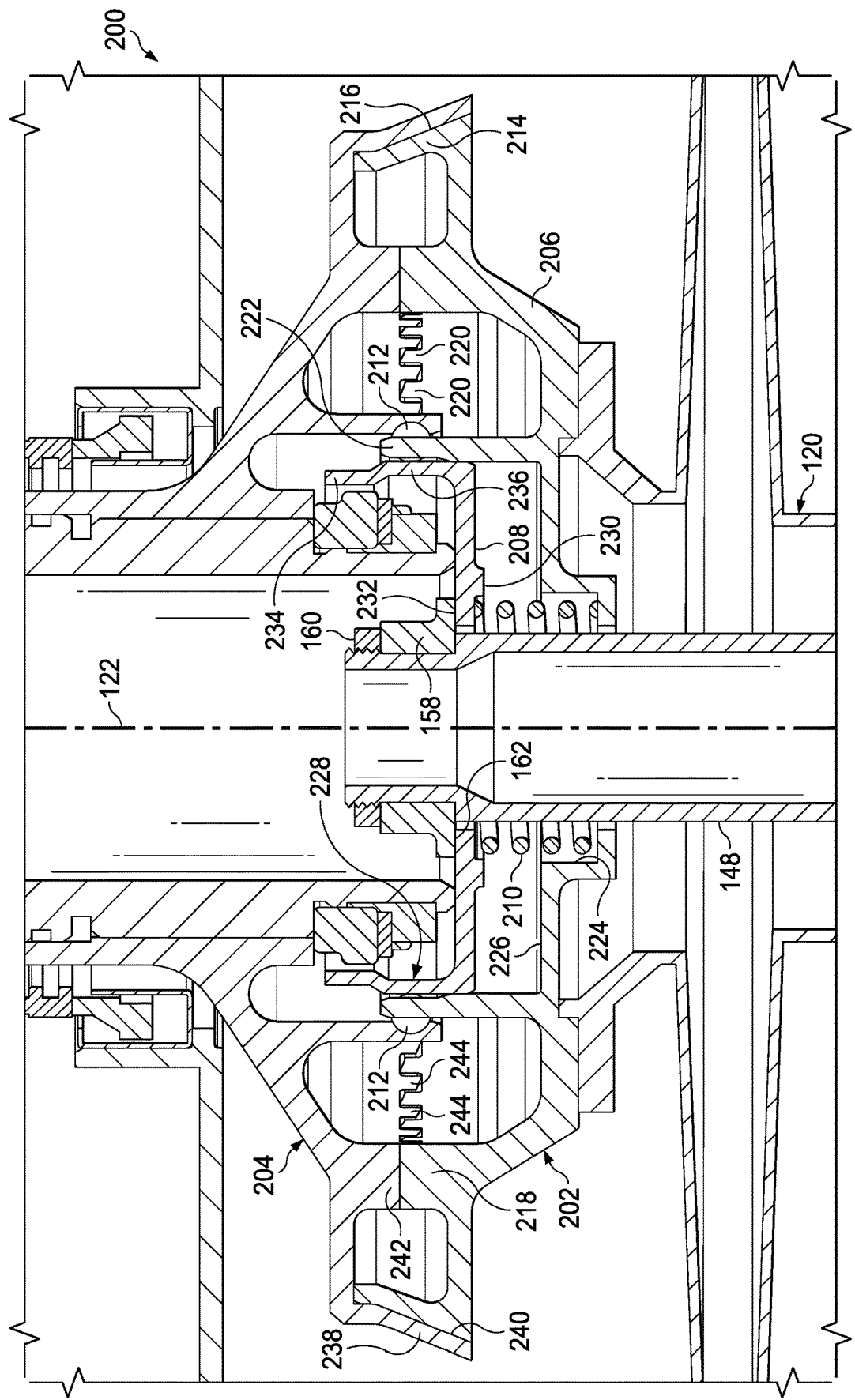
FIG. 6A is a cross-sectional side view of a locking mechanism for locking the compressible driveshaft in the engaged position, shown in a locked position.
Figure 6B:
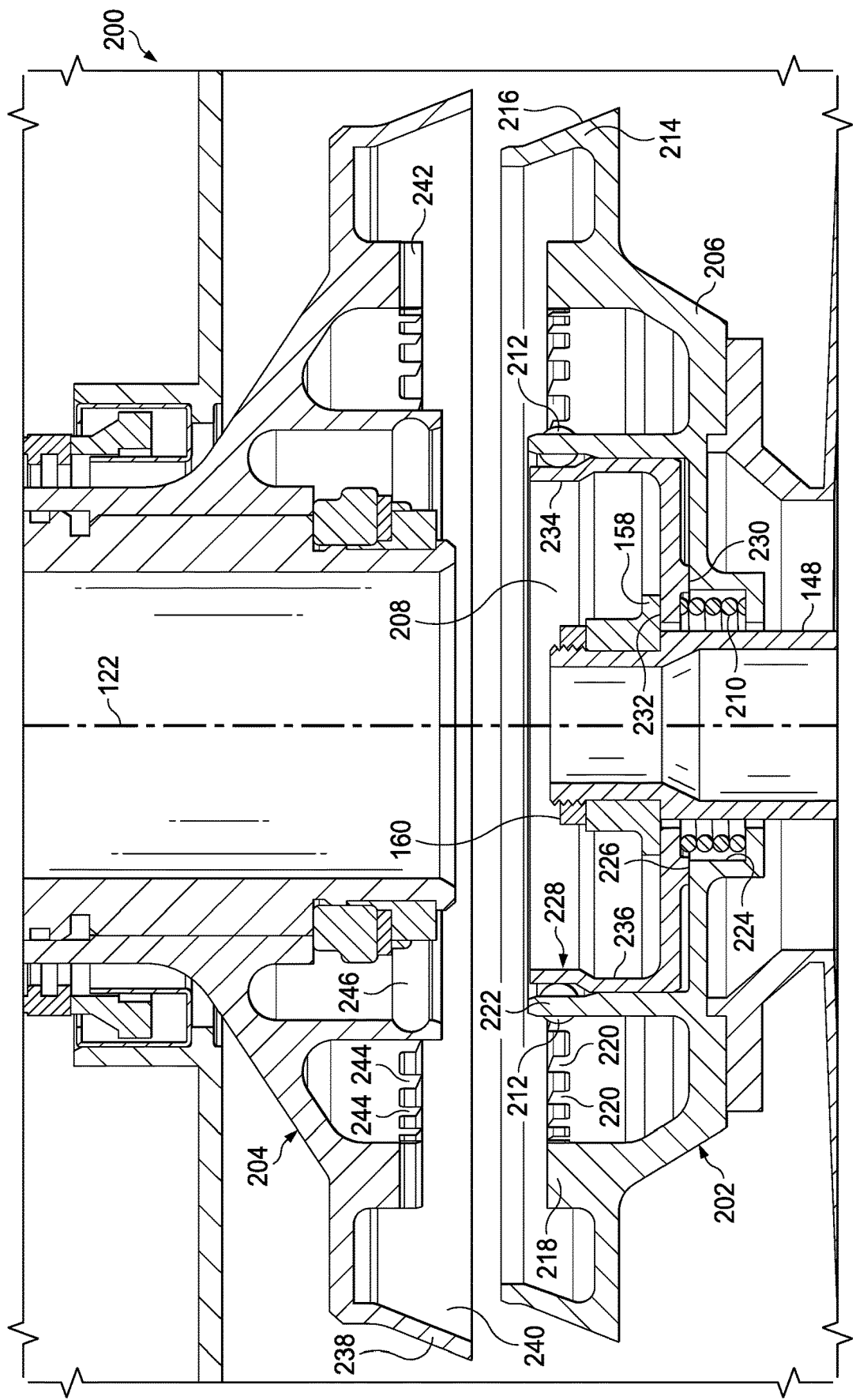
FIG. 6B is a cross-sectional side view of the locking mechanism for locking the compressible driveshaft in the engaged position, shown in an unlocked position.

Referring now to FIGS. 6A and 6B, an axially actuated locking mechanism 200 for use with compressible driveshaft 120 is shown. Locking mechanism 200 includes a drive portion 202 that replaces engagement portion 138 and is coupled to first end 144 of compressible driveshaft 120 and a driven portion 204 that replaces mating surface 140 and is coupled to mid-wing gearbox 124. Drive portion 202 includes a housing 206, a chock 208, a chock spring 210, a plurality of locking balls 212, and actuator rod 148. Housing 206 includes an alignment rim 214 located around a perimeter of housing 206 that has a sloped outer surface 216 configured to correct axial misalignment during engagement, a first engagement portion 218 including a plurality of face splines 220, a ball cage 222 configured to hold locking balls 212 while permitting each locking ball 212 to shift radially to vary the amount of locking balls 212 that protrude on either side of ball cage 222, a spring recess 224 configured to secure chock spring 210 and permit compression of chock spring 210 therein, and a chock bearing surface 226 configured to receive a compressive force from chock 208 after chock spring 210 is fully compressed. Chock 208 includes an outer wall 228 configured to bear against locking balls 212, a housing bearing surface 230 configured to transmit an axial force from chock 208 to housing 206, and an actuator rod bearing surface 232 configured to receive the compressive force from bottom surface 162 of annular flange 158. Outer wall 228 has a top portion 234 and a bottom portion 236, wherein top portion 234 has a smaller outer diameter than bottom portion 236. Driven portion 204 includes an alignment ring 238 having a sloped inner surface 240 configured to cooperate with sloped outer surface 216 of alignment rim 214 to correct axial misalignment during engagement, a second engagement portion 242 including a plurality of face splines 244 configured to cooperatively engage face splines 220 and receive torque transferred therefrom, and a locking groove 246 configured to receive a portion of each of locking balls 212 therein.

FIG. 6A shows locking mechanism 200 in a locked position. In the locked position, bottom portion 236 of outer wall 228 of chock 208 applies a radially outward force against locking balls 212, forcing a portion of each of locking balls 212 radially outward into locking groove 246 of driven portion 204. Interference between locking balls 212 and locking groove 246 prevents relative axial movement between drive portion 202 and driven portion 204 along rotation axis 122. To unlock locking mechanism 200, and disengage compressible driveshaft 120, the same process described above is utilized. That is, there are no additional steps required to unlock locking mechanism 200. Just as described above, the actuator (not shown) translates actuator rod 148 along rotation axis 122 towards second end 146 of compressible driveshaft 120. Translation of actuator rod 148 causes bottom surface 162 of annular flange 158 to apply a compressive force against actuator rod bearing surface 232 of chock 208. Because chock spring 210 has a spring rate that is less than the spring rate of compressible sections 142, chock 208 translates downward along rotation axis 122, compressing chock spring 210 into spring recess 224. When utilizing locking mechanism 200 with a rigid driveshaft, the rigid driveshaft includes a spring proximate an opposite end of the rigid driveshaft that biases the rigid driveshaft towards mid-wing gearbox 124, and the spring rate of chock spring 210 is less than the spring rate of the spring proximate the opposite end of the rigid driveshaft, thereby allowing compression of chock spring 210 prior to translation of the rigid driveshaft. The translation of chock 208 changes the contact of outer wall 228 with locking balls 212 from bottom portion 236 to top portion 234. The smaller diameter of top portion 234 allows locking balls 212 to move radially inward toward rotation axis 122, and out of locking groove 246. When chock 208 contacts housing 206 the compressive force is transferred to, and causes the compression of, compressible sections 142. Compression of compressible section 142 decreases the length of compressible driveshaft 120 and pulls first engagement portion 218 of drive portion 202 out of engagement with second engagement portion 242 of driven portion 204, as shown in FIG. 6B.

Reengagement of compressible driveshaft 120 and locking mechanism 200 is done by simply releasing the compressive force applied thereto through actuator rod 148. As the compressive force is released, compressible sections 142 begin to expand. As drive portion 202 approaches driven portion 204, first contact is made between sloped outer surface 216 and sloped inner surface 240. Sloped surfaces 216, 240 guide compressible driveshaft 120 into proper axial alignment with mid-wing gearbox 124. In addition, sloped surfaces 216, 240 may include cooperating teeth (not shown) that cause relative rotation between drive portion 202 and driven portion 204 to properly align face splines 220 with face splines 244. Because chock spring 210 has a lower spring rate than compressible sections 142, chock spring 210 remains compressed until first engagement portion 218 is meshed with second engagement portion 242. After meshing, chock spring 210 pushes chock 208 vertically along rotation axis 122 and bottom portion 236 of outer wall 228 drives locking balls 212 radially outward into locking groove 246, thereby locking locking mechanism 200, as shown in FIG. 6A.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A locking mechanism, comprising:
   a drive portion, comprising:
   a housing including a first engagement portion configured to transfer torque, a ball cage including a plurality of locking balls contained at least partially therein, the ball cage being configured to permit the plurality of locking balls to move radially, the housing further including a chock bearing surface;
   a chock including an actuator rod bearing surface, a housing bearing surface, and an outer wall including a top portion and a bottom portion, wherein the top portion of the outer wall has a smaller outer diameter than the bottom portion, the chock being sized to fit at least partially within the ball cage, and the bottom portion of the outer wall being sized to push the plurality of locking balls radially outward in a locked position;

a chock spring configured to bias the housing bearing surface of the chock away from the chock bearing surface of the housing; and an actuator rod including an annular flange configured to bear against the actuator rod bearing surface of the chock; and a driven portion, comprising:
a second engagement portion configured to cooperatively engage and receive the torque from the first engagement portion, and a locking groove configured to receive a portion of each of the plurality of locking balls therein.

2. The locking mechanism of claim 1, wherein the chock spring is configured to compress from a compressive force applied by the actuator rod, thereby allowing the chock to translate from the locked position wherein the bottom portion of the outer wall of the chock bears against the plurality of locking balls holding them at least in part within the locking groove of the driven portion to the unlocked position wherein the top portion of the outer wall of the chock allows the plurality of locking balls to move radially inwards out of the locking groove.

3. The locking mechanism of claim 2, wherein the first engagement portion and the second engagement portion comprise complimentary face splines.

4. The locking mechanism of claim 3, wherein the housing of the drive portion further includes an alignment rim and the driven portion further includes an alignment ring, the alignment rim including a sloped outer surface configured to contact a sloped inner surface of the alignment ring.

5. The locking mechanism of claim 4, wherein the actuator rod extends through the housing, the chock spring, and the chock.

6. The locking mechanism of claim 5, wherein the ball cage is located radially inwards of the first engagement portion.

7. The locking mechanism of claim 6, wherein the alignment rim is located radially outwards of the first engagement portion.

8. The locking mechanism of claim 7, wherein compression of the chock spring allows the housing bearing surface of the chock to contact the chock bearing surface of the housing, and wherein the drive portion is configured to disengage from the driven portion when an additional compression force is applied by the actuator rod after the housing bearing surface of the chock contacts with the chock bearing surface of the housing.

9. A method of locking a driveshaft to an apparatus, comprising:
providing a locking mechanism, comprising:
a drive portion coupled to the driveshaft including a first end, a second end, a length extending from the first end to the second end, and a rotation axis, the drive portion, comprising:
a housing including a first engagement portion, a ball cage including a plurality of locking balls contained at least partially therein;
a chock including an outer wall having a top portion and a bottom portion, wherein the top portion of the outer wall has a smaller outer diameter than the bottom portion;

a chock spring configured to bias the chock away from the housing along the rotation axis; and
an actuator rod including an annular flange configured to bear against the chock; and
a driven portion coupled to the apparatus, the driven portion, comprising:
a second engagement portion configured to cooperatively engage and receive torque from the first engagement portion, and a locking groove configured to receive a portion of each of the plurality of locking balls therein;
releasing a compressive force applied to the chock by the actuator rod along the rotation axis, wherein releasing the compressive force allows the chock spring to translate the chock along the rotation axis; and
applying a radially outward force against the plurality of locking balls, thereby locking a portion of each of the plurality of locking balls into the locking groove.

10. The method of claim 9, wherein the compressive force is applied to the chock radially between the rotation axis and the outer wall of the chock.

11. The method of claim 10, wherein the radially outward force is applied to the plurality of locking balls by the bottom portion of the outer wall of the chock.

12. The method of claim 11, further comprising:
unlocking the driveshaft from the apparatus by translating the actuator rod along the rotation axis until the chock spring is compressed, thereby removing the radially outward force applied against the plurality of locking balls; and
disengaging the first engagement portion from the second engagement portion by continuing to translate the actuator rod along the rotation axis after the chock spring is fully compressed.

13. An aircraft, comprising:
a fuselage;
a gearbox;
a driveshaft including a first end, a second end, a length extending from the first end to the second end, and a rotation axis; and
a locking mechanism, comprising:
a drive portion coupled to the first end of the driveshaft, the drive portion, comprising:
a housing including a first engagement portion configured to transfer torque, a ball cage including a plurality of locking balls contained at least partially therein, the ball cage being configured to permit the plurality of locking balls to move radially;
a chock including an outer wall including a top portion and a bottom portion, wherein the top portion of the outer wall has a smaller outer diameter than the bottom portion, the chock being sized to fit at least partially within the ball cage, and the bottom portion of the outer wall being sized to push the plurality of locking balls radially outward in a locked position;
a chock spring configured to bias the chock away the housing along the rotation axis; and
an actuator rod configured to apply an axial force to the chock; and
a driven portion coupled to the gearbox, the driven portion, comprising:
a second engagement portion configured to cooperatively engage and receive the torque from the first engagement portion, and a locking groove configured to receive a portion of each of the plurality of locking balls therein.

14. The aircraft of claim 13, wherein the chock spring is configured to compress from a compressive force applied by the actuator rod, thereby allowing the chock to translate from the locked position wherein the bottom portion of the outer wall of the chock bears against the plurality of locking balls holding them at least in part within the locking groove of the driven portion to the unlocked position wherein the top portion of the outer wall of the chock allows the plurality of locking balls to move radially inwards out of the locking groove.

15. The aircraft of claim 14, wherein the first engagement portion and the second engagement portion comprise complimentary face splines.

16. The aircraft of claim 15, wherein the housing of the drive portion further includes an alignment rim and the driven portion further includes an alignment ring, the alignment rim including a sloped outer surface configured to contact a sloped inner surface of the alignment ring.

17. The aircraft of claim 16, wherein the actuator rod extends through the housing, the chock spring, and the chock.

18. The aircraft of claim 17, wherein the ball cage is located radially inwards of the first engagement portion.

19. The aircraft of claim 18, wherein the alignment rim is located radially outwards of the first engagement portion.

20. The aircraft of claim 19, wherein compression of the chock spring allows a housing bearing surface of the chock to contact a chock bearing surface of the housing, and wherein the drive portion is configured to disengage from the driven portion when additional compression force is applied by the actuator rod after the housing bearing surface of the chock contacts with the chock bearing surface of the housing.

* * * * *